United States Patent
Fetescu et al.

(10) Patent No.: US 6,892,523 B2
(45) Date of Patent: May 17, 2005

(54) COOLING-AIR COOLER FOR A GAS-TURBINE PLANT AND USE OF SUCH A COOLING-AIR COOLER

(75) Inventors: Mircea Fetescu, Ennetbaden (CH); Erhard Liebig, Laufenburg (DE)

(73) Assignee: Alstom Technology LTD, Baden (CH)

( * ) Notice: Subject to any disclaimer, the term of this patent is extended or adjusted under 35 U.S.C. 154(b) by 97 days.

(21) Appl. No.: 10/613,213

(22) Filed: Jul. 7, 2003

(65) Prior Publication Data

US 2004/0255571 A1 Dec. 23, 2004

Related U.S. Application Data

(63) Continuation of application No. 09/758,187, filed on Jan. 12, 2001, now abandoned.

(30) Foreign Application Priority Data

Jan. 13, 2000 (DE) .......................................... 100 01 112

(51) Int. Cl.[7] .............................................. F02C 7/141
(52) U.S. Cl. .......................... 60/39.53; 60/728; 60/806; 261/152
(58) Field of Search ................ 60/39.53, 728, 60/806; 165/163; 261/152, 153

(56) References Cited

U.S. PATENT DOCUMENTS

| | | |
|---|---|---|
| 1,736,408 A | 11/1929 | Lauer |
| 2,553,121 A | 5/1951 | Touton |
| 3,212,571 A | 10/1965 | Nicholas |
| 3,274,752 A | 9/1966 | Huyghe et al. |
| 3,398,720 A | 8/1968 | Nicholas |
| 3,799,249 A | 3/1974 | Linhardt |
| 3,800,553 A | 4/1974 | Engalitcheff, Jr. |
| 4,157,114 A | 6/1979 | De Lorenzo |
| 4,394,142 A | 7/1983 | Thimons et al. |
| 4,494,596 A | 1/1985 | Bradshaw |
| 4,715,871 A | 12/1987 | Uratani |
| 5,510,087 A | 4/1996 | Johnson et al. |
| 5,534,230 A | 7/1996 | Johnson et al. |
| 5,797,259 A | 8/1998 | Nielsen et al. |
| 6,070,655 A | 6/2000 | Heikkila |

FOREIGN PATENT DOCUMENTS

| | | |
|---|---|---|
| DE | 41 42 375 | 7/1993 |
| DE | 43 23 719 | 1/1995 |
| DE | 195 41 914 | 5/1997 |
| GB | 902856 | 8/1962 |
| GB | 1 503 871 | 3/1978 |

*Primary Examiner*—Michael Koczo, Jr.
(74) *Attorney, Agent, or Firm*—Burns, Doane, Swecker & Mathis, L.L.P.

(57) ABSTRACT

In a cooling-air cooler for a gas-turbine plant of a power plant, in which cooling-air cooler first means for spraying water into the cooling-air flow and second means for generating steam are arranged in a pressure vessel, through which the cooling air flows, between a cooling-air inlet and a cooling-air outlet in the cooling-air flow, simplified operation is achieved in that a water separator is provided on the cooling-air side in the direction of flow downstream of the first means.

5 Claims, 7 Drawing Sheets

COOLING-AIR COOLER FOR A GAS-TURBINE PLANT AND USE OF SUCH A COOLING-AIR COOLER

This application is a continuation of application Ser. No. 09/758,187, filed on Jan. 12, 2001 now abandoned.

FIELD OF THE INVENTION

The present invention relates to the field of power plant technology. It concerns a cooling-air cooler for a gas-turbine plant of a power plant. The invention also relates to the use of such a cooling-air cooler.

BACKGROUND OF THE INVENTION

Such a cooling-air cooler has been disclosed, for example, by European Patent Application EP-A1-0 773 349 of the applicant.

In gas-turbine plants it is normal practice to branch off some of the combustion air drawn in and compressed by the compressor as cooling air, to cool it down in a downstream cooling-air cooler and to use it for cooling thermally loaded parts of the turbine and/or the combustion chamber. If the gas-turbine plant, taken on its own, works in an open gas cycle (simple cycle), that is, for example, in a gas-turbine power plant, or in combination with a steam cycle (combined cycle), for example in a combined-cycle power plant in which the water/steam circuit is not installed until later (phased construction) or has failed for some reason or other, the cooling in the cooling-air cooler is effected by spraying in water and/or by external cooling.

If the gas-turbine plant works as part of a combined-cycle power plant, the heat extracted from the cooling air in the case of a cooling-air cooler of appropriate construction may be used to generate additional steam for the water/steam circuit.

In the publication mentioned at the beginning, a cooling-air cooler suitable for both applications is proposed, in which cooling-air cooler, in a pressure vessel, on the one hand, the cooling air to be cooled flows around spiral evaporator tubes in counterflow in the axial direction and, on the other hand, water can be sprayed into the cooling air on the inlet side of the cooling air (FIG. 3 of the publication). In addition, it is possible for some of the steam generated in the cooling-air cooler to be injected on the outlet side into the cooling air (FIG. 4 of the publication).

The direct spraying of water into the cooling air flowing through the cooling-air cooler is not without problems: if too much water is sprayed in, the cooling air will possibly contain water droplets when leaving the cooling-air cooler, and these water droplets may have a harmful effect during the cooling of the thermally highly loaded parts of the gas-turbine plant, for example due to erosion. If not enough water is sprayed in, the requisite cooling of the cooling air may possibly not be achieved. Since the thermal conditions with regard to the cooling air change during the transition between various operating states of the plant, the supply of water to the cooling-air cooler must be carefully controlled in order to avoid the abovementioned damage. This requires considerable control input.

SUMMARY OF THE INVENTION

The object of the invention is therefore to provide a cooling-air cooler for gas-turbine plants having alternative cooling by spraying in water and/or steam generation, which cooling-air cooler does not have the disadvantages of known cooling-air coolers and in particular imposes considerably smaller demands on the control of the sprayed water quantity.

The essence of the invention is to separate excess water not evaporated by the cooling air by a water separator arranged on the air side. In this way, with at the same time improved cooling, a greater quantity of water can be sprayed in without damage occurring in the parts of the gas-turbine plant which are to be cooled. In this way, a protective function is built into the plant.

A preferred embodiment of the cooler according to the invention is characterized in that the first means are arranged directly downstream of the cooling-air inlet, in that the water separator is arranged directly upstream of the cooling-air outlet, and in that the second means are arranged between the first means and the water separator. As a result, a maximum flow path is achieved for the cooling air, and the latter can evaporate the sprayed water on this flow path while cooling down.

In a first development of this embodiment, the second means comprise a plurality of spiral tubes through which water or steam flows and which extend in the form of spirals along an axis lying parallel to the flow direction. As a result, with compact external dimensions, a large heat-transfer area for generating steam is achieved.

A large heat-transfer area can also be achieved if, in a second development, the second means comprise a plurality of finned tubes through which water or steam flows and which are arranged parallel to one another and extend parallel to the cooling-air-side flow direction.

The steam generation is especially effective if, in a third development, the second means are subdivided into a first section for generating saturated steam and a second section for generating live steam, if the two sections are connected one behind the other, and if one of the two sections comprises a plurality of spiral tubes through which water or steam flows, and the other of the two sections comprises a plurality of finned tubes through which water or steam flows.

According to the invention, the cooling-air cooler as provided by the invention is used in the gas-turbine plant of a gas-turbine power plant, in which case the cooling of the cooling air in the cooling-air cooler is effected solely by spraying in water by the first means, or the cooling of the cooling air in the cooling-air cooler is optionally effected by spraying in water by the first means and/or by generating steam by the second means, and the generated steam is used for injecting into the gas-turbine plant.

If the gas-turbine plant comprises a compressor and a turbine, the generated steam may be injected between compressor and turbine. However, it may also be injected into the cooling air.

Furthermore, the cooling-air cooler according to the invention may be used in the gas-turbine plant of a combined-cycle power plant. If the water/steam circuit in the combined-cycle power plant is omitted due to a failure of the water/steam circuit or in the course of a stage-by-stage development of the combined-cycle power plant, the cooling of the cooling air in the cooling-air cooler is preferably effected either solely by spraying in water by the first means or optionally by spraying in water by the first means and/or by generating steam by the second means, and the generated steam being used for injecting into the gas-turbine plant.

Alternatively, during normal operation of the combined-cycle plant, the cooling of the cooling air in the cooling-air cooler is effected solely by generating steam by the second means, the generated steam being fed into the water/steam circuit of the combined-cycle power plant.

BRIEF DESCRIPTION OF THE DRAWING

The invention is to be explained in more detail below with reference to exemplary embodiments in connection with the drawings, in which:

FIG. 2a shows a cross-section through an individual finned tube;

FIG. 3a shows a cross-section through an individual finned tube;

DETAILED DESCRIPTION OF THE INVENTION

Figure 1:
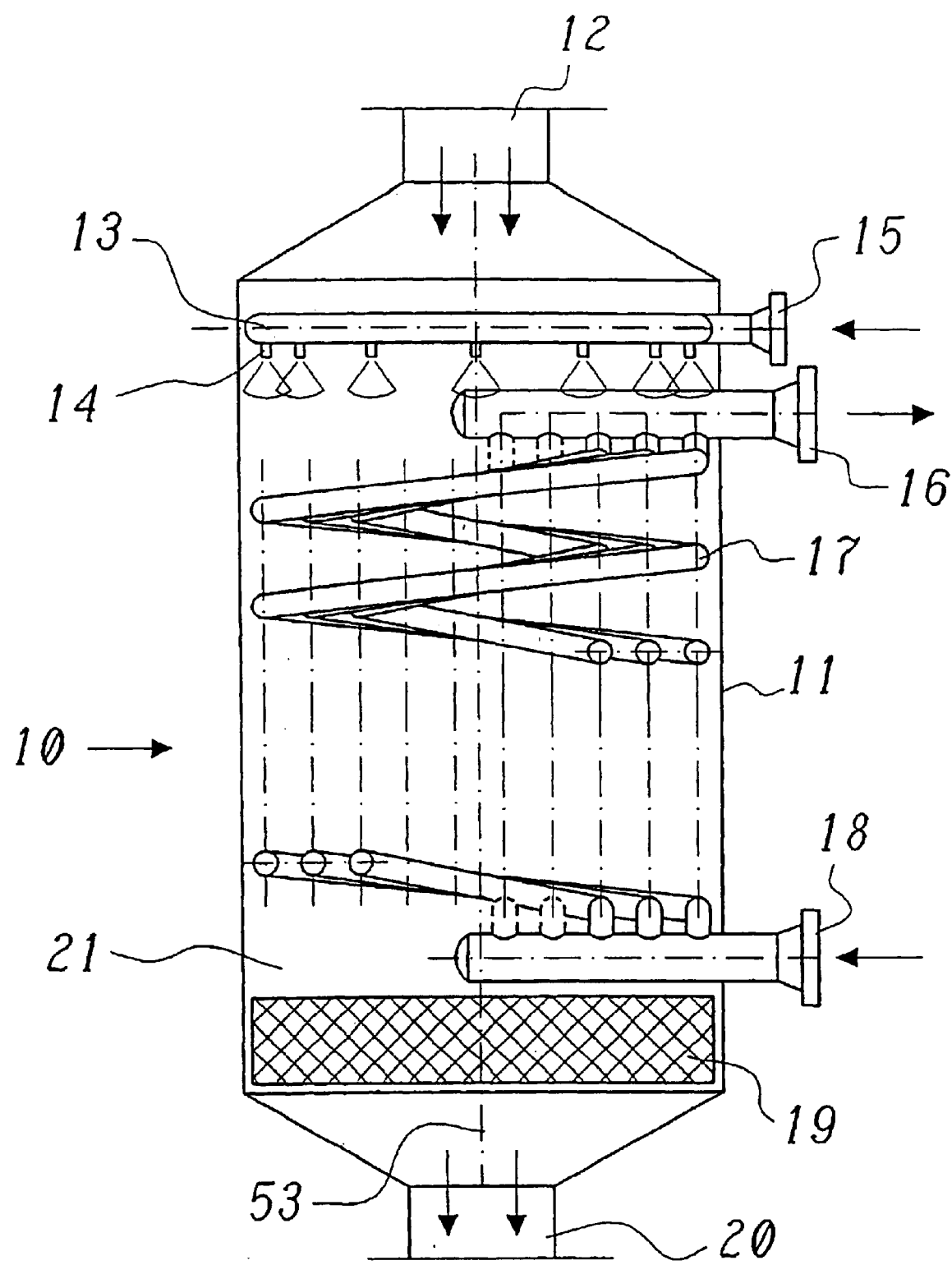
FIG. 1 shows a simplified longitudinal section through a cooling-air cooler in a first exemplary embodiment of the invention with spirally wound steam-generation tubes.

A cooling-air cooler in a first exemplary embodiment is shown in FIG. 1 in a simplified longitudinal section. The cooling-air cooler 10 comprises a preferably cylindrical pressure vessel 11 which—in an upright position—has a cooling-air inlet 12 at the top and a cooling-air outlet 20 at the bottom. During operation, the cooling air to be cooled flows from top to bottom (in the direction of the double arrows) through the interior space 21 of the pressure vessel 11.

The cooling of the cooling air in the cooling-air cooler 10 may now be effected in two different ways: In one case, water is sprayed into the cooling-air flow, and this water evaporates in the hot cooling-air flow and thus extracts heat from the cooling air. Provided for this purpose in the pressure vessel 11 downstream of the cooling-air inlet is a water-spraying device which comprises a ring line 13 having a plurality of attached injection nozzles 14 directed downward. The water to be sprayed is fed to the ring line 13 via a connection 15 and is sprayed via the injection nozzles 14 (indicated in FIG. 1 by spray cones).

In the other case, the cooling air to be cooled flows around a plurality of spiral tubes 17, which extend spirally one inside the other along the axis 53 of the pressure vessel 11 and convert the water (feedwater) supplied via a feedwater inlet 18 into steam (for example saturated steam), which is extracted at a saturated-steam outlet 16.

A water separator 19, through which the cooling air flows, is arranged below the spiral tubes 17 upstream of the cooling-air outlet 20. The task of the water separator 19 is to separate water which has been sprayed through the injection nozzles 14 and has not been evaporated by the cooling-air flow and to deliver this water separately to the outside via a device (not shown in FIG. 1). The cooled cooling-air flow, which leaves the cooling-air cooler 10 through the cooling-air outlet 20, is then virtually free of moisture, which would constitute a risk during the subsequent use of the cooling air in the gas-turbine plant. The water separator 19 normally functions according to the inertia principle, i.e. the cooling-air flow is deflected in a suitable manner in such a way that the inert "water drops" are unable to follow the deflection and strike a wall and are deposited there. The water separator 19 preferably consists of many individual sub-units which work in parallel and are combined to form a stack. A suitable water separator, which consists of a multiplicity of parallel, spirally wound passages, is commercially obtainable, for example, under the designation "ZYKLOTOP" from the German company Richard Tscherwitschke GmbH, Leinfelden-Echterdingen. The water separator 19 enables more water to be sprayed in than can actually be evaporated by the cooling-air flow. As a result, the setting of the sprayed water quantity per unit of time in the varying operating states is substantially simplified. The arrangement of the water separator 19 directly upstream of the cooling-air outlet 20 provides, for the cooling-air flow, a maximum flow path for the evaporation of the sprayed water. However, it is also conceivable to arrange the water separator 19 at another point of the cooling-air cooler 10.

The water spraying via the injection nozzles 14 and the steam generation by means of the spiral tubes 17 constitute two cooling mechanisms which are independent of one another and, depending on the application, may be used alternatively or at the same time. In this way, it is possible for a single type of cooling-air cooler to cover the various applications in a gas-turbine power plant or a combined-cycle power plant at different stages of development, as will be explained in more detail further below in connection with FIGS. 4–7.

Figure 2:
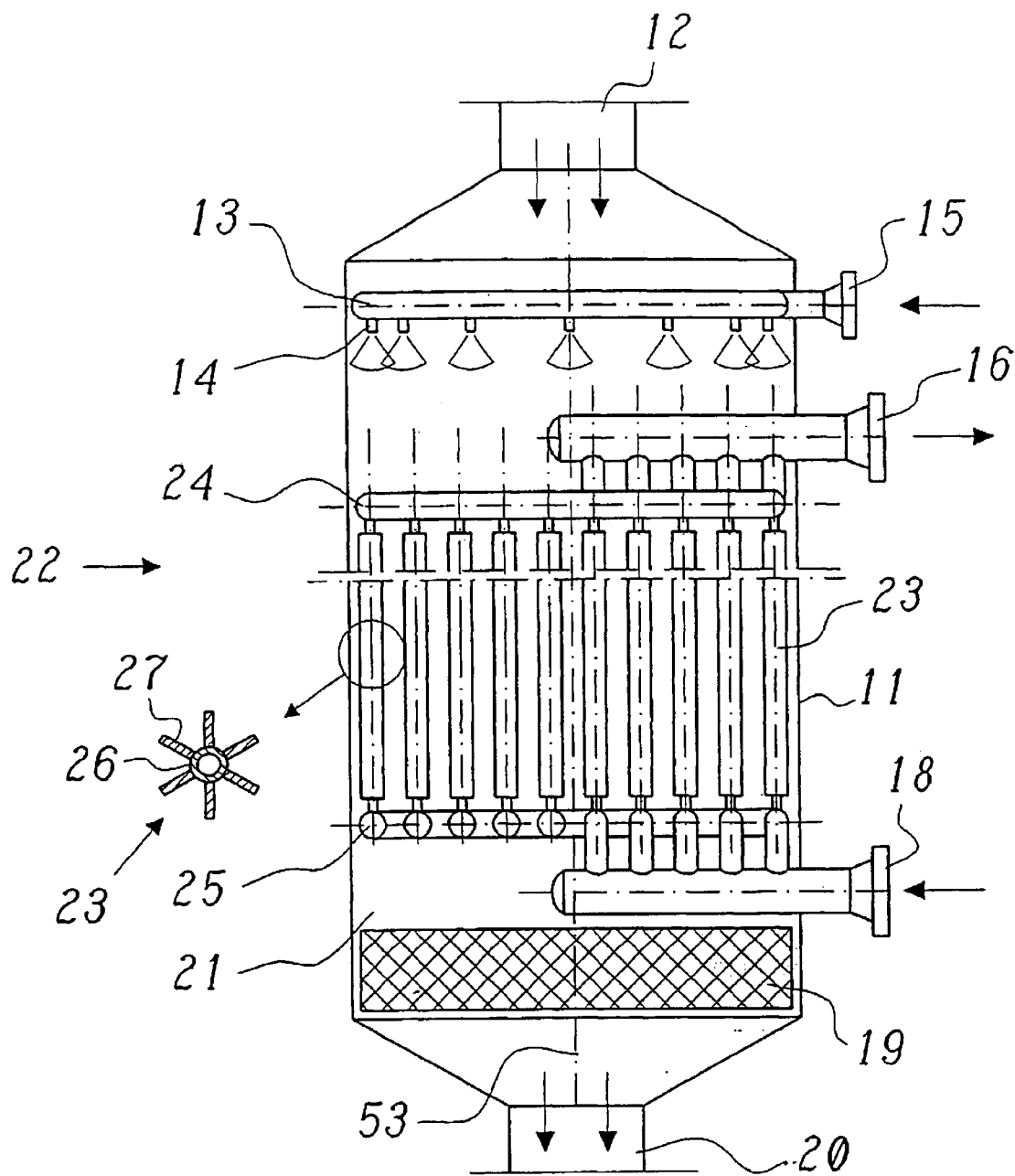
FIG. 2 shows, in a representation comparable with FIG. 1, a cooling-air cooler in a second exemplary embodiment of the invention with parallel finned tubes as steam-generation tubes.

A form of the cooling-air cooler differing from the cooling-air cooler 10 from FIG. 1 is reproduced in FIG. 2. The cooling-air cooler 22 in FIG. 2, with regard to pressure vessel 11, cooling-air inlet and outlet 12 and 20 respectively, the water-spraying device 13, 14, 15 and the water separator 19, is certainly largely identical to the cooling-air cooler 10 from FIG. 1. A different feature, however, is the design of the steam-generation section. Here, instead of spiral tubes, bundles of finned tubes 23 are provided, which extend parallel to one another and to the axis 53 and are connected via corresponding concentric bundles of ring lines 24, 25 to the feedwater inlet 18 and saturated-steam outlet 16, respectively. The cross section through an individual finned tube 23 is shown in FIG. 2a and clearly shows that the individual finned tube 23 shown in FIG. 2a and clearly shows that the individual finned tube 23 in each case consists of a central tube 26, to the outside of which a plurality of axially running fins 27 are attached for enlarging the heat-transfer area with a simultaneously low pressure drop. The feedwater and the saturated steam, respectively, flow through the finned tubes 23 from bottom to top in counterflow to the cooling air.

In another exemplary embodiment (FIG. 3), the steam-generation part lying between water-spraying device 13, 14, 15 and water separator 19 is subdivided in the cooling-air cooler 28 into two sections. The bottom section corresponds in its construction to the steam-generation part from FIG. 2 and is equipped with finned tubes 23 and can be connected separately via feedwater inlet 18 and saturated-steam outlet 16. The top section corresponds in its construction to the steam-generation part in FIG. 1 and is equipped with spiral tubes 17 and can be connected separately via saturated-steam inlet 18' and live-steam outlet 16'. However, a reversed configuration is also conceivable. The feedwater, which enters at the bottom via the feedwater inlet 18 during the cooling by steam generation, is evaporated in the finned tubes 23 by the cooling air, which flows in counterflow. The steam produced is removed at the saturated-steam outlet 16 and is fed directly into the saturated-steam inlet 18' of the top section (flow arrow in FIG. 3). The steam is superheated there when flowing through the spiral tubes 17 and discharges as live steam at the live-steam outlet 16'. Alternatively, the cooling air may also be cooled by spraying water via the injection nozzles 14.

Figure 3:
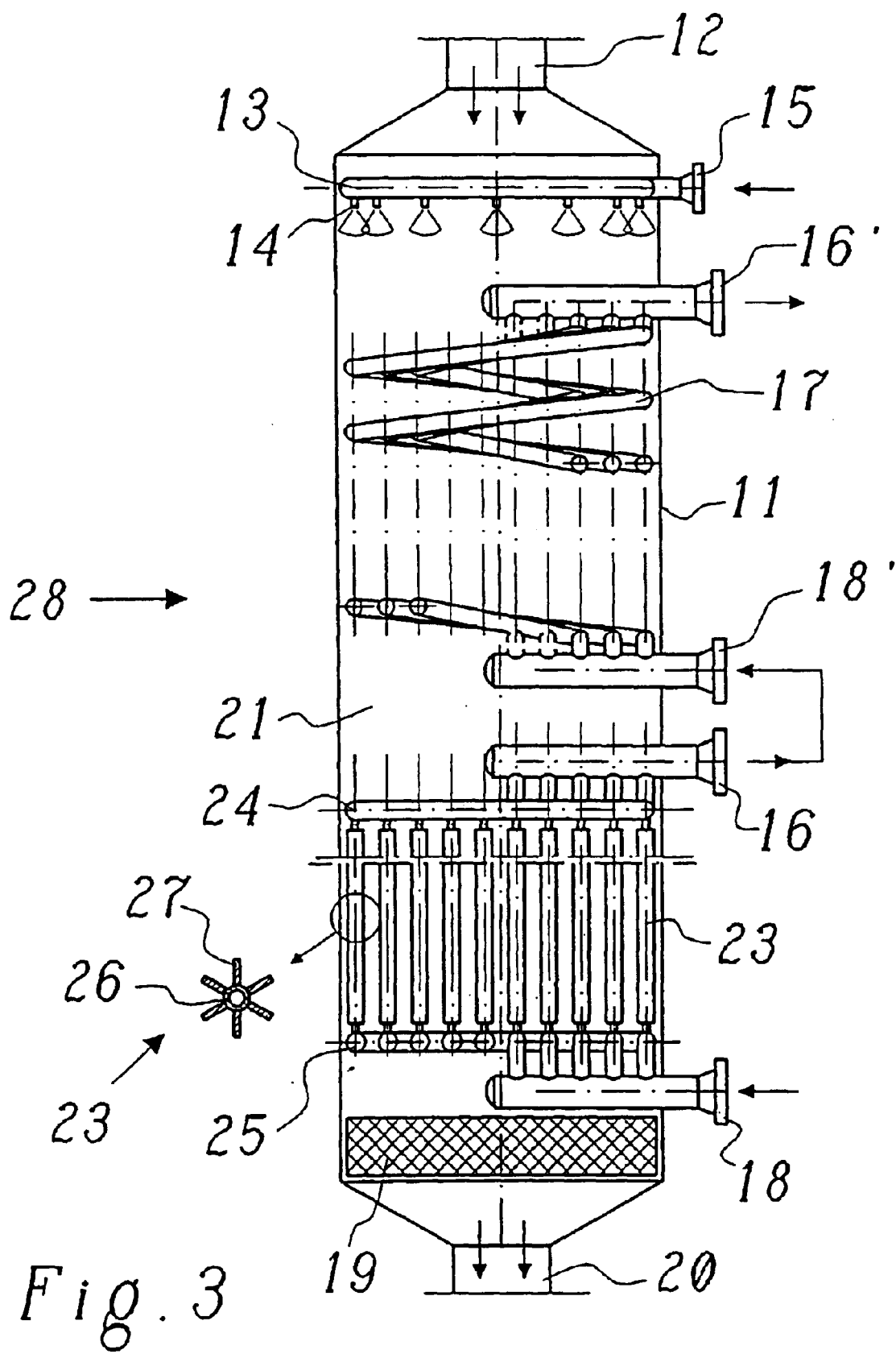
FIG. 3 shows, a representation comparable with FIG. 1, a cooling-air cooler in a third exemplary embodiment with a subdivided steam-generation part with parallel finned tubes as steam-generation tubes in one section and spirally wound steam-generation tubes in the other section.
Figure 4:
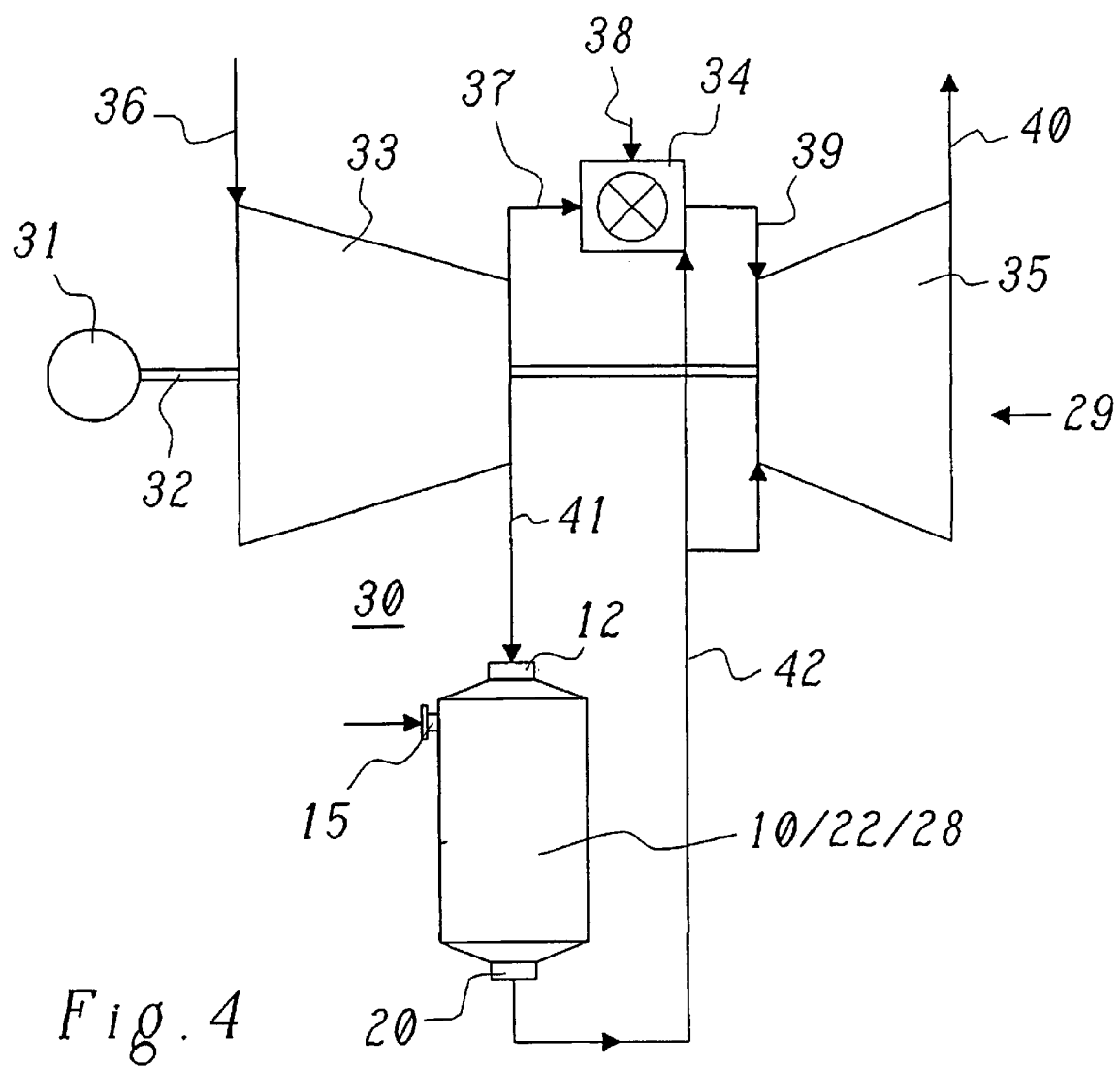
FIG. 4 shows a first exemplary embodiment for the use according to the invention of the cooling-air cooler as provided by the invention in a gas-turbine plant working in the open gas cycle, the cooling being effected solely by spraying in water.

A cooling-air cooler 10, 22 or 28 according to the examples from FIGS. 1–3 may now be used, for example, in a gas-turbine plant 29 of a power plant 30 according to the scheme shown in FIG. 4: The gas-turbine plant 29 comprises (on a rotor) a compressor 33 and a turbine 35, which drive a generator 31 via a shaft 32. The compressor 33 draws in air 36 and compresses it to form combustion air 37, which is used in a combustion chamber 34 for the combustion of a fuel 38. The flue gas 39 produced drives the turbine 35 and leaves the plant as exhaust gas 40. Cooling air 41 is branched off from the air compressed in the compressor 33 (at the outlet of the compressor as shown in FIG. 4, or at an intermediate pressure) and is fed through a cooling-air cooler 10, 22 or 28 of the type described. The cooling is effected solely by spraying in water, which is fed to the cooling-air cooler 10 or 20 or 28 via the connection 15. The cooled cooling air 42 mixed with steam is then used for cooling (and for simultaneous injection of steam) at the combustion chamber 34 and/or the turbine 35. This type of operation is not only suitable when the power plant 30 is a pure gas-turbine power plant but is also suitable in combined-cycle power plants in which either the water/steam circuit has failed or, in a previous stage of development, is still not even present or connected.

Figure 5:
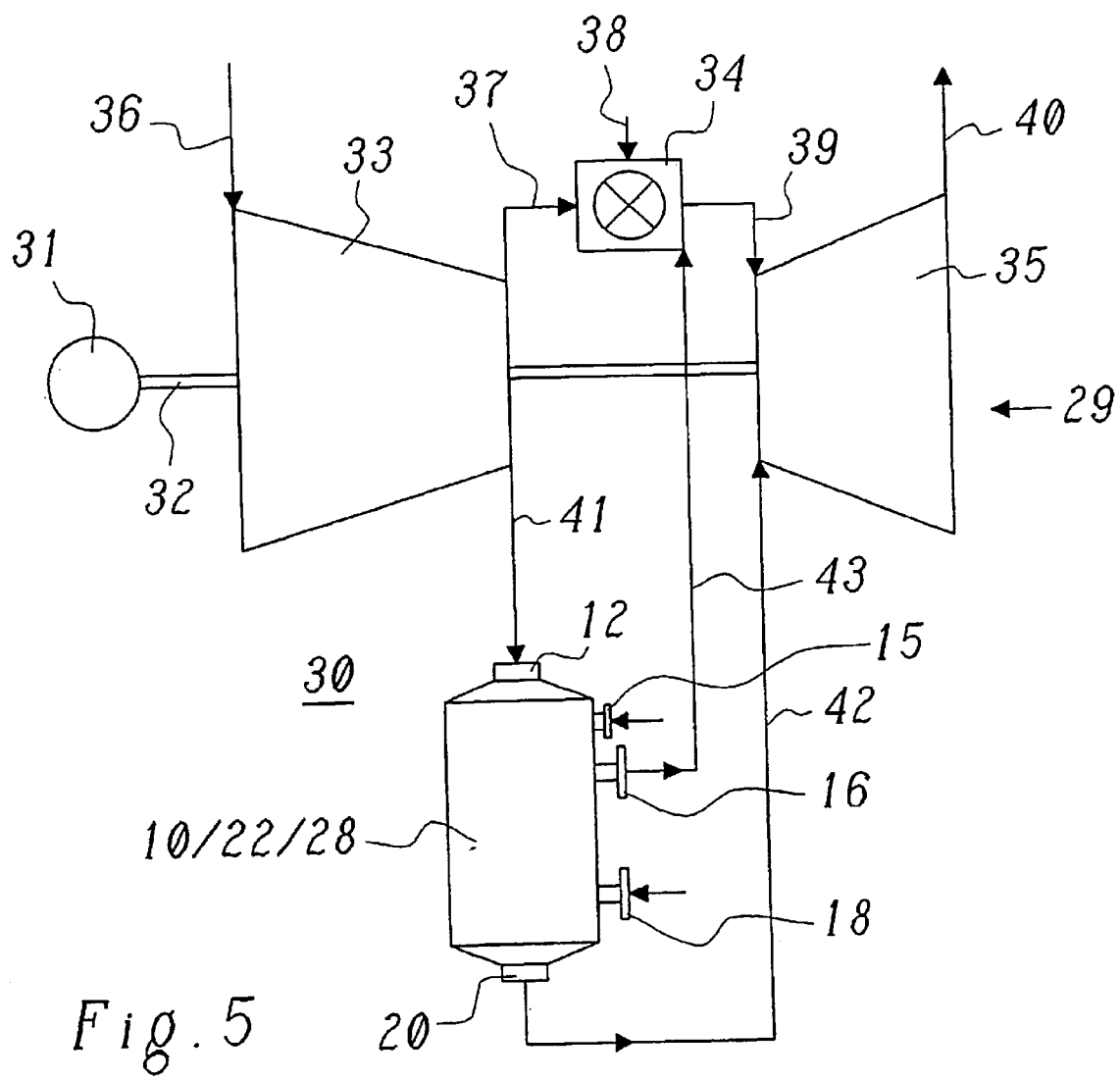
FIG. 5 shows a second exemplary embodiment for the use according to the invention of the cooling-air cooler as provided by the invention in a gas-turbine plant working in the open gas cycle, the cooling being effected by spraying in water and/or by generating steam, and the steam being injected into the gas-turbine plant between compressor and turbine.

According to FIG. 5, however, it is also conceivable to supply feedwater to the cooling-air cooler 10 or 22 or 28 in addition to or instead of the spraying of water and to remove the steam 43 produced at the saturated-steam outlet 16 and to inject it (directly) into the gas-turbine plant 29 between the compressor 33 and the turbine 35.

Figure 6:
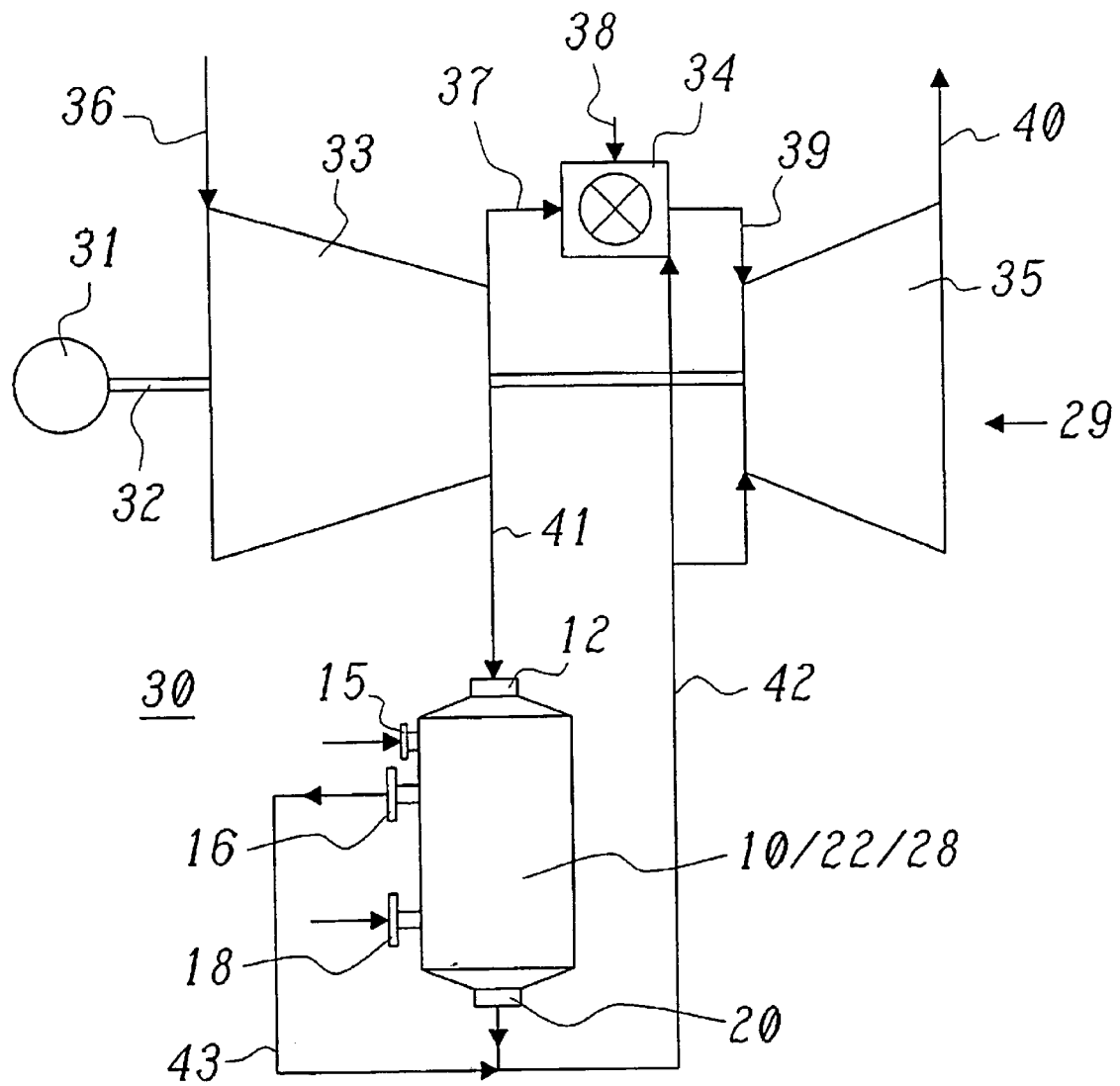
FIG. 6 shows a third exemplary embodiment for the use according to the invention of the cooling-air cooler as provided by the invention in a gas-turbine plant working in the open gas cycle, the cooling being effected by spraying in water and/or by generating steam, and the steam being injected into the cooling air.

Alternatively, however, the generated steam 43 may also be injected according to FIG. 6 into the cooled cooling air 42 in order to then pass (indirectly) together with the cooling air into the gas-turbine plant, e.g. to the combustion chamber 34 or to the turbine 35.

Figure 7:
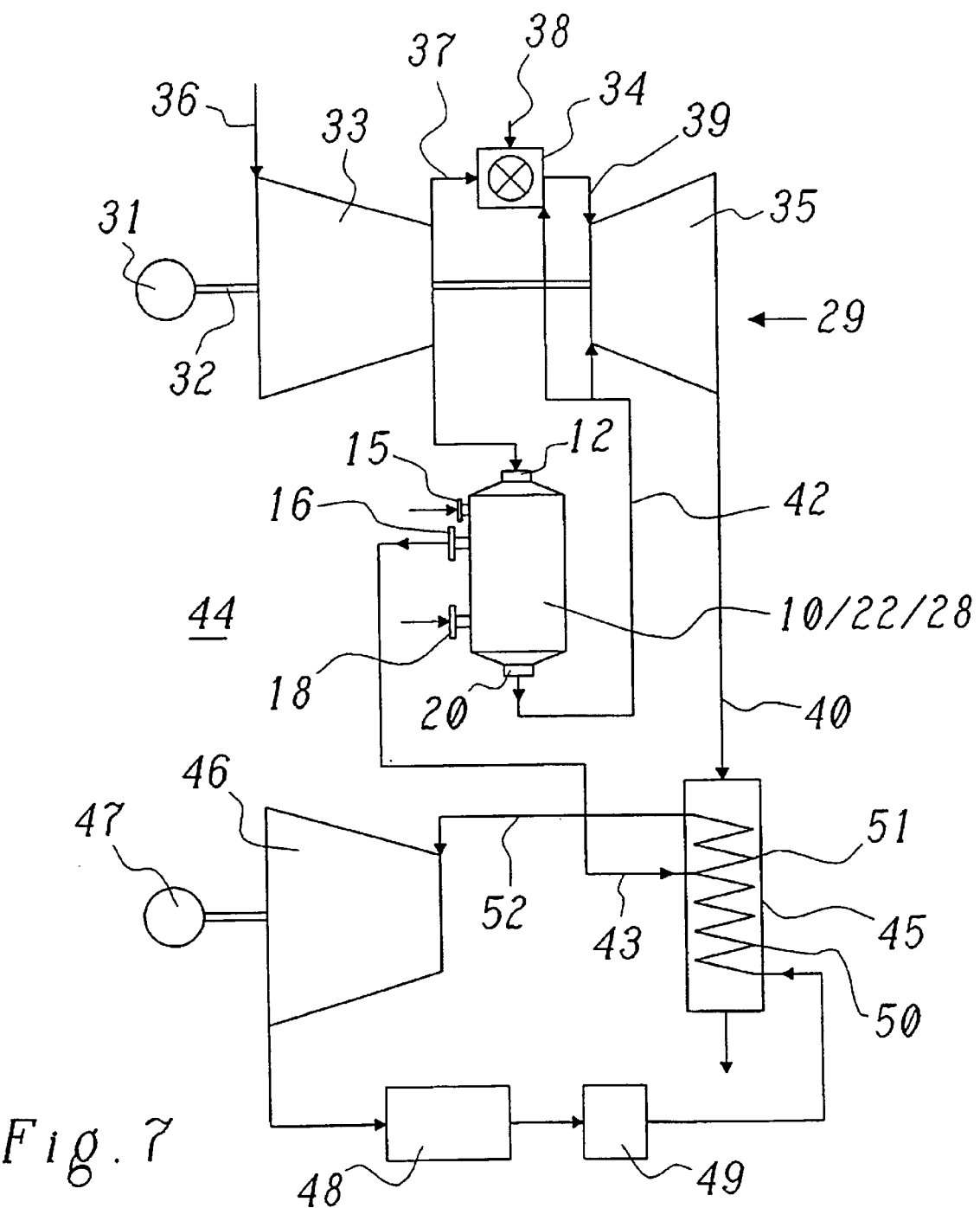
FIG. 7 shows an exemplary embodiment for the use according to the invention of the cooling-air cooler as provided by the invention in a combined-cycle power plant, the cooling being optionally effected by spraying in water and/or by generating steam, and the steam being used in the water/steam circuit.

If the cooling-air cooler 10 or 22 or 28 is used in a combined-cycle power plant having a functioning water/steam circuit, a mode of operation according to FIG. 7 is possible: the combined-cycle power plant 44, in addition to the gas-turbine plant 29 known from FIGS. 5 and 6, also comprises a steam turbine 46, which drives a second generator 47 for example, a heat-recovery boiler 45, in which the exhaust gas 40 of the turbine 35 is used for generating steam, a condenser 48, and also a feedwater tank 49 and associated pumps (not shown). Feedwater from the feedwater tank 49 is preheated and evaporated in the heat-recovery boiler 45 in an evaporator 50 and is superheated in a downstream superheater 51 and is delivered as live steam 52 to the steam turbine 46. The steam expanded in the steam turbine 46 is condensed in the condenser 48. The condensate passes into the feedwater tank 49 and from there into the heat-recovery boiler 45 again. If steam 43 is now generated in the cooling-air cooler 10 or 22 or 28, this steam 43 can be fed into the superheater 51 of the heat-recovery boiler 45. If live steam is generated with a cooling-air cooler 28 according to FIG. 3, this live steam may also be delivered directly to the steam turbine 46. Here, too, spraying of water in the cooling-air cooler via the connection 15 may be used to provide additional cooling capacity during load peaks or to ensure emergency cooling of the gas-turbine plant 29 if the water/steam circuit fails. In this way, redundancy of the cooling or additional safety during operation can be achieved by the alternative operation of the cooling-air coolers.

What is claimed is:

1. A gas-turbine plant of a power plant, comprising:
   a compressor, a combustion chamber, a gas turbine and a cooling air-cooler, the cooling-air cooler is configured and arranged to receive a flow of compressed cooling air from the compressor, to cool down the flow of compressed cooling air and to forward the flow of compressed cooled cooling air to thermally loaded parts of the gas turbine and/or the combustion chamber, the cooling air-cooler comprising:
   a pressure vessel extending along a longitudinal axis from a first end to a second end;
   a cooling-air inlet at said first end of said pressure vessel and a cooling-air outlet at said second end of said pressure vessel, said pressure vessel being configured and arranged to guide a flow of cooling air from said cooling-air inlet along said axis through said cooling-air outlet, such that cooling air can enter said pressure vessel through said cooling-air inlet, flow through said pressure vessel along said axis as a cooling-air flow and exit said pressure vessel through said cooling-air outlet;
   within said pressure vessel means for spraying water into the cooling-air flow that flows through said pressure vessel from said cooling-air inlet to said cooling-air outlet, whereby said water-spraying means comprise a plurality of nozzles oriented in parallel to said longitudinal axis such that water is sprayed from said nozzles in the direction of said cooling-air flow;
   within said pressure vessel heat exchanging means which are arranged in said cooling-air flow; and
   within said pressure vessel a water separator arranged in said cooling-air flow between said water-spraying means and said cooling-air outlet.

2. The gas-turbine plant as claimed in claim 1, wherein said water spraying means are arranged directly downstream of the cooling-air inlet,
   said water separator is arranged directly upstream of the cooling-air outlet, and
   said heat exchanging means are arranged between said water spraying means and the water separator.

3. The gas-turbine plant as claimed in claim 1, wherein said heat exchanging means comprise a plurality of spiral tubes through which water or steam flows and which extend in the form of spirals along said longitudinal axis.

4. The gas-turbine plant as claimed in claim 1, wherein said pressure vessel is configured and arranged to flow said cooling air flow from said cooling-air inlet to said cooling-air outlet in a single pass, and the heat exchanging means are configured and arranged to flow through a fluid in counter flow with regard to said cooling-air flow.

5. A gas-turbine plant of a power plant, comprising:

a compressor, a combustion chamber, a gas turbine and a cooling air-cooler, the cooling-air cooler is configured and arranged to receive a flow of compressed cooling air from the compressor, to cool down the flow of compressed cooling air and to forward the flow of compressed cooled cooling air to thermally loaded parts of the gas turbine and/or the combustion chamber, the cooling air-cooler comprising:

a pressure vessel having a cooling air inlet and a cooling air outlet through which cooling air flows;

means for spraying water into the cooling air flow, said water spraying means being disposed in said pressure vessel, and comprising a plurality of nozzles oriented in parallel to said cooling-air flow such that water is sprayed from said nozzles in the direction of said cooling-air flow;

heat exchanging means disposed in the pressure vessel; and a water separator disposed downstream of the flow from said water spraying means.

* * * * *